March 20, 1962  P. WEISMAN ETAL  3,026,468
TRANSISTOR SWITCH FOR SATURATING TRANSFORMER
Filed Dec. 4, 1958

WITNESSES
John E. Healy Jr.
James F. Young

INVENTORS
Paul Weisman &
James C. Carroll
BY
Paul E. Friedemann
ATTORNEY

United States Patent Office 3,026,468
Patented Mar. 20, 1962

3,026,468
TRANSISTOR SWITCH FOR SATURATING TRANSFORMER
Paul Weisman and James C. Carroll, Irwin, Pa., assignors to Westinghouse Electric Corporation, East Pittsburgh, Pa., a corporation of Pennsylvania
Filed Dec. 4, 1958, Ser. No. 778,115
5 Claims. (Cl. 321—11)

This invention relates to current limiting means for a saturating transformer.

Saturating transformers are widely used as reference devices. A saturating transformer functions like an ordinary transformer until it saturates. After it saturates it effectively shorts out the load and in consequence the current in the primary winding rises to excessive value unless some means is provided to limit the current in the primary winding.

Prior practice was to use a series resistor in the primary winding circuit to limit the current after saturation. The value of the resistance chosen was a design compromise between two requirements; low resistance compared to the reflected load, and high resistance for effective current limiting after saturation. Ideally, the resistance should be zero before saturation and infinite after saturation.

One object of this invention is to provide, for a saturating transformer, a low resistance in the primary circuit before saturation and a very high resistance in the primary circuit after saturation.

It is a more specific object to provide, for a transformer, a switching transistor associated with the primary circuit and controlled by saturation of the transformer to substantially open the primary winding circuit after saturation.

Other objects and advantages will become more apparent from a study of the following specification and accompanying drawing, in which.

Figure 1:
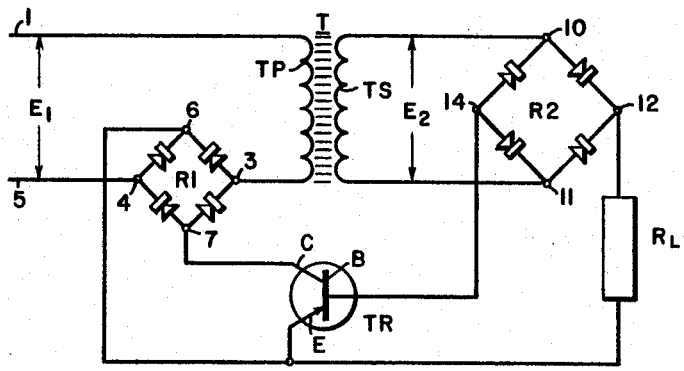
FIG. 1 shows the current limiting circuitry for a saturating transformer.

In FIG. 1, the transformer primary winding TP of transformer T is shown connected in a loop circuit with the alternating current input terminals 3 and 4 of the full-wave rectifier R1, and the terminals 1 and 5 energized with a suitable single phase alternating current.

The direct current output terminals 6 and 7 of the rectifier R1 are connected in a circuit with the emitter E, the base B and collector C of the transistor TR.

The secondary winding TS of the transformer T is connected in a circuit with the alternating current terminals, or input terminals, 10 and 11 of the full-wave rectifier R2.

The direct current terminals, or output terminals, 12 and 14 are connected in a biasing circuit including a load unit, as a resistor, $R_L$, the emitter E of the transistor TR, and the base B of the transistor. Normally this biasing circuit, as long as the transformer is not saturated, biases the transistor to conduction, namely, a closed circuit condition.

Figure 2:
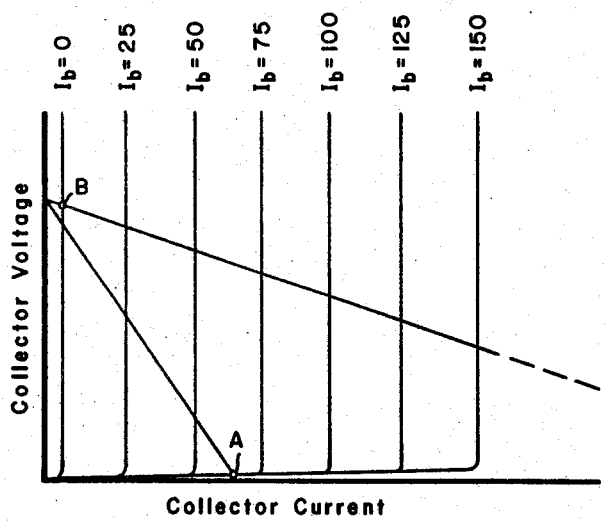
FIG. 2 shows the transistor characteristic used to effect switching operation.

The showing thus discloses a transistor switch. A voltage $E_1$ is applied to the primary of the transformer. Before the core is saturated, a voltage $E_2$ appears across the secondary winding and a unidirectional current $I_L$ flows through $R_L$. The transistor is at this time operating at point A (see FIG. 2) which operating point is determined mainly by the load resistance. Most of the voltage appears across the saturating transformer. The transistor base feed, or bias, is provided by the load current $I_L$. After the transformer core saturates, the load current $I_L$ no longer flows and the base bias is so changed that the transistor operation instantly changes from point A to point B and operates at point B for the remainder of the half cycle. This transistor operating point is on a different load line and is determined by the resistance of the primary winding and the forward resistance of the diodes of rectifier R1, since the load resistance is no longer reflected to the primary winding. Most of the voltage now appears across the transistor. The primary current is limited to a very small amount, making the power drain negligible.

The switching transistor is a great improvement over the use of a current limiting resistor. If a current limiting resistor is used, most of the input power is wasted in the resistor after transformer core saturation, leaving only a fraction of the available power for useful output. However, when using the transistor switch, in accordance with this invention, the wasted power is reduced to a negligible amount. This permits the operation of the saturating transformer at a higher power output. In an actual comparison of the circuitry herein disclosed and the circuitry of the prior art, it was found that for a fixed output, the required input power was one tenth the former value.

This invention has two important uses. The device may be employed as a voltage reference. Variations on input voltage would effect the firing time of the core. If the voltage is increased by a factor of 5 then the saving of power approaches $\frac{1}{10}$ the power required by present methods.

A second use of the device is as a frequency meter. If the frequency is varied over a 10:1 range, then the power requirements of the drive are $\frac{1}{10}$ the former value. An actual use of this invention was as a frequency meter.

A second circuit that would give the same performance would employ an additional secondary winding and a rectifier bridge to provide the base drive to the transistor.

While but one circuit arrangement has been disclosed in detail, it is apparent that this invention is capable of modifications falling within the scope of this invention.

We claim as our invention:

1. Current limiting means for a saturating transformer, in combination, two terminals energized with single phase alternating current, a full-wave rectifier, a transformer having a primary winding and a secondary winding, said primary winding being connected, through the alternating current terminals of the rectifier, to said two terminals energized with a suitable supply of single phase alternating current, a transistor having a base, a collector, and an emitter, with the collector and emitter being connected in series, through the direct current terminals of the full-wave rectifier, with the primary winding of the transformer, and means for changing the voltage on the base as a function of the output of the secondary winding to rapidly decrease the current in the collector of the transistor upon saturation of the transformer.

2. Current limiting means for a saturating transformer, in combination, a pair of supply terminals energized from a suitable source of single phase alternating current, a full-wave rectifier having alternating current input terminals and direct current output terminals, a transistor having a base, a collector, and an emitter, a transformer having a primary winding and a secondary winding, a first circuit including the supply terminals, the primary windings of the transformer and the alternating current terminals of the full-wave rectifier, a second circuit including the direct current terminals of the rectifier, the collector, the base and the emitter, a load unit for the secondary winding, said load unit including rectifying means having a pair of direct current terminals that are interconnected with the base and the emitter of the transistor to thus effect a switching operation of the transistor upon saturation of the transformer.

3. Current limiting means for a saturating transformer, in combination, a pair of supply terminals energized from a suitable source of single phase alternating currents, a full-wave rectifier having alternating current input terminals and direct current output terminals, a transistor having a base, a collector, and an emitter, a transformer having a primary winding and a secondary winding, a first circuit including the supply terminals, the primary windings of the transformer and the alternating current terminals of the full-wave rectifier, a second circuit including the direct current terminals of the rectifier, the collector, the base and the emitter, a second full-wave rectifier having alternating current input terminals and direct current output terminals, said alternating current input terminals of the second rectifier being connected across the terminals of the secondary windings of the transformer, said transistor base being interconnected with the direct current output terminals of the second rectifier to thus effect a switching operation of the transistor upon saturation of the transformer to effect substantially open circuit conditions for the transformer primary winding during the saturating period of the transformer.

4. Current limiting means for a saturating transformer, in combination, a pair of supply terminals energized from a suitable source of single phase alternating current, a full-wave rectifier having alternating current input terminals and direct current output terminals, a transistor having a base, a collector, and an emitter, a transformer having a primary winding and a secondary winding, a first circuit including the supply terminals, the primary windings of the transformer and the alternating current terminals of the full-wave rectifier, a second circuit including the direct current terminals of the rectifier, the collector, the base and the emitter, a second full-wave rectifier having alternating current input terminals and direct current output terminals, said alternating current input terminals of the second rectifier being connected across the terminals of the secondary windings of the transformer, a load unit, a third circuit including the load unit, the emitter of the transistor, the base of the transistor and the direct current output terminals of the second full-wave rectifier.

5. In current limiting means for a saturating transformer, in combination, a rectifier having alternating current input terminals and direct current output terminals, a transformer having primary windings and secondary windings, said primary windings being interconnected with the alternating current input terminals of the rectifier, a transistor having a collector, a base, and emitter interconnected with the direct current output terminals of the rectifier, rectifying means having alternating current input terminals and direct current output terminals, said transformer secondary windings being inteconnected with the alternating current input terminals of said rectifying means, said direct current output terminals of said rectifying means being interconnected with the emitter and the base of said transistor to thus change the bias voltage on the base upon saturation of the transformer to place the primary winding substantially on open circuit.

References Cited in the file of this patent
UNITED STATES PATENTS

| | | |
|---|---|---|
| 2,773,132 | Bright | Dec. 4, 1956 |
| 2,802,166 | Sanderlin et al. | Aug. 6, 1957 |

FOREIGN PATENTS

| | | |
|---|---|---|
| 337,366 | Italy | Mar. 3, 1936 |

OTHER REFERENCES

"Transistor Controlled Magnetic Amplifier," by Spencer Electronics (August 1953) (pp. 136–140 relied on).